United States Patent
Sakai et al.

(10) Patent No.: US 12,093,664 B2
(45) Date of Patent: Sep. 17, 2024

(54) PSEUDO SPECKLE PATTERN GENERATION DEVICE, PSEUDO SPECKLE PATTERN GENERATION METHOD, OBSERVATION DEVICE, AND OBSERVATION METHOD

(71) Applicant: HAMAMATSU PHOTONICS K.K., Hamamatsu (JP)

(72) Inventors: Hiroto Sakai, Hamamatsu (JP); Taro Ando, Hamamatsu (JP); Haruyoshi Toyoda, Hamamatsu (JP); Yoshiyuki Ohtake, Hamamatsu (JP); Yuu Takiguchi, Hamamatsu (JP); Tomoko Hyodo, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 105 days.

(21) Appl. No.: 18/076,721

(22) Filed: Dec. 7, 2022

(65) Prior Publication Data

US 2023/0101292 A1    Mar. 30, 2023

Related U.S. Application Data

(62) Division of application No. 16/603,906, filed as application No. PCT/JP2018/012131 on Mar. 26, 2018, now Pat. No. 11,567,732.

(30) Foreign Application Priority Data

Apr. 10, 2017 (JP) ................................ 2017-077475

(51) Int. Cl.
*G06F 7/58* (2006.01)
*G02B 21/06* (2006.01)
(Continued)

(52) U.S. Cl.
CPC ................ *G06F 7/582* (2013.01); *G06F 7/58* (2013.01); *G02B 21/06* (2013.01); *G02B 27/48* (2013.01); *G03H 1/12* (2013.01); *G03H 1/16* (2013.01)

(58) Field of Classification Search
CPC . G06F 7/58; G06F 7/582; G06F 17/15; G06F 17/14–142; G02B 21/06;
(Continued)

(56) References Cited

U.S. PATENT DOCUMENTS 5,589,955 A     12/1996   Amako et al.
2006/0050374 A1  3/2006   Slinger
(Continued)

FOREIGN PATENT DOCUMENTS

CN        1946983 A     4/2007
CN      101288105 A    10/2008
(Continued)

OTHER PUBLICATIONS

International Preliminary Report on Patentability mailed Oct. 24, 2019 for PCT/JP2018/012131.
(Continued)

*Primary Examiner* — Jyoti Mehta
*Assistant Examiner* — Huy Duong
(74) *Attorney, Agent, or Firm* — Faegre Drinker Biddle & Reath LLP

(57) ABSTRACT

A pseudo speckle pattern generation apparatus includes a light source, a beam expander, and a spatial light modulator. The spatial light modulator has an intensity modulation distribution based on a pseudo speckle pattern calculated from a pseudo random number pattern and a correlation function, receives light output from the light source and increased in beam diameter by the beam expander, spatially modulates the received light according to the modulation distribution, and outputs modulated light.

3 Claims, 18 Drawing Sheets

(51) Int. Cl.
  *G02B 27/48* (2006.01)
  *G03H 1/12* (2006.01)
  *G03H 1/16* (2006.01)

(58) Field of Classification Search
  CPC . G02B 27/48; G02F 1/13; G03H 1/12; G03H 1/16; G03H 1/32; G03H 1/08; G03H 1/2294; G03H 2225/32; G03H 2001/0816
  See application file for complete search history.

(56) References Cited

U.S. PATENT DOCUMENTS

| | | |
|---|---|---|
| 2009/0002787 A1 | 1/2009 | Cable et al. |
| 2010/0202725 A1 | 8/2010 | Popovich et al. |
| 2014/0253989 A1 | 9/2014 | Kurashige |

FOREIGN PATENT DOCUMENTS

| | | |
|---|---|---|
| JP | H6-241725 A | 9/1994 |
| JP | 2002-207202 A | 7/2002 |
| JP | 2009-511897 A | 3/2009 |
| JP | 2011-508911 A | 3/2011 |
| WO | WO 2005/103610 A1 | 11/2005 |
| WO | WO 2007/043036 A | 4/2007 |
| WO | WO 2009/087358 A1 | 7/2009 |

OTHER PUBLICATIONS

Bromberg, Yaron et al., "Generating Non-Rayleigh Speckles with Tailored Intensity Statistics," Physical Review Letters 112, 2014, pp. 213904-1-213904-5.

Mudry, E. et al., "Structured illumination microscopy using unknown speckle patterns," Nature Photonics, vol. 6, 2012, pp. 312-315.

Shvedov, Vladlen G. et al., "Selective trapping of multiple particles by vol. speckle field," Optics Express, vol. 18, No. 3, 2010, pp. 3137-3142.

Fig.3

| CORRELATION FUNCTION C(r) | PARAMETER RANGE | FILTER FUNCTION F(k) |
|---|---|---|
| $(r/\eta)^\alpha e^{-r/\xi}$ | $\alpha > -2$ | $\xi \left(\sqrt{\frac{\xi}{\eta}}\right)^\alpha \sqrt{\Gamma(\alpha+2) F\left(\frac{\alpha+2}{2}, \frac{\alpha+3}{2}; 1; -\xi^2 k^2\right)}$ |
| $e^{-r/\xi}$ | - | $\xi(1+\xi^2 k^2)^{-3/4}$ |
| $e^{-r/\xi}/r$ | - | $\sqrt{\xi}(1+\xi^2 k^2)^{-1/4}$ |
| $(r/\eta)^\alpha$ | $-2 < \alpha < -\frac{1}{2}$ | $\left(\frac{\sqrt{2}}{\eta}\right)^\alpha \sqrt{(-\alpha)\Gamma\left(1+\frac{\alpha}{2}\right)/\Gamma\left(1-\frac{\alpha}{2}\right)} \frac{1}{k^{1+\alpha/2}}$ |
| $e^{-r^2/\xi^2}$ | - | $(\xi/\sqrt{2})e^{-\xi^2 k^2/8}$ |
| $(r^2+\xi^2)^\alpha$ | $\alpha < -\frac{1}{4}$ | $\left(\sqrt{2\xi/k}\right)^{\alpha+1} \sqrt{K_{\alpha+1}/\Gamma(-\alpha)}$ |
| $\dfrac{e^{-\sqrt{r^2+\eta^2}/\xi}}{\sqrt{r^2+\eta^2}}$ | - | $\sqrt{\xi}\exp\left(-\frac{\eta}{2\xi}\sqrt{1+k^2\xi^2}\right)(1+\eta^2\xi^2)^{-1/4}$ |

WHERE, $\Gamma(z)$  GAMMA FUNCTION $F(a,b;c;z)$ GAUSS HYPERGEOMETRIC FUNCTION $$F(a,b;c;z) = \frac{\Gamma(c)}{\Gamma(a)\Gamma(b)} \sum_{n=0}^{\infty} \frac{\Gamma(a+n)\Gamma(b+n)}{\Gamma(c+n)} \frac{z^n}{n!}$$

$K_n(z)$  $\eta$-TH ORDER "MODIFIED BESSEL FUNCTION OF THE SECOND KIND"

Fig.4
(a)
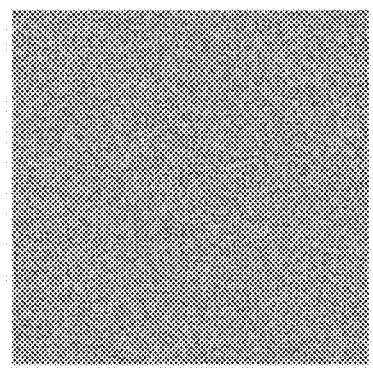
(b)
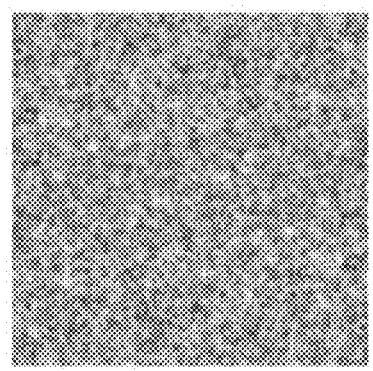

Fig.5
(a)
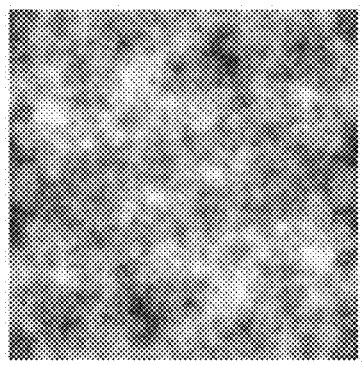
(b)
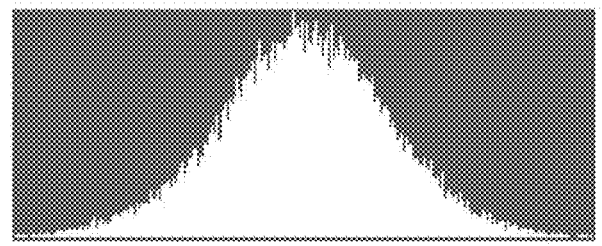

*Fig.7*
(a)
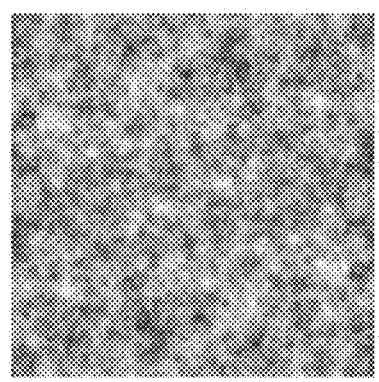
(b)
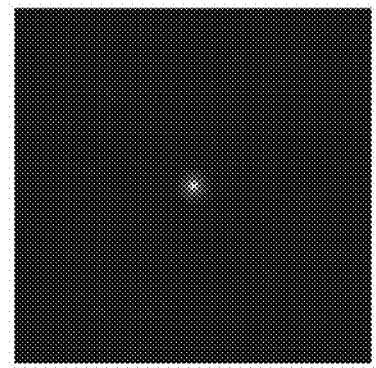

*Fig.14*
(a)
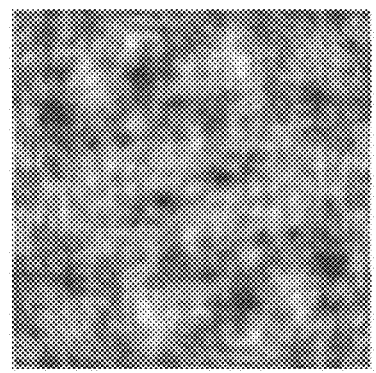
(b)
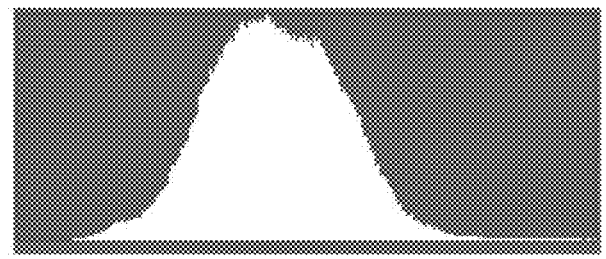

PSEUDO SPECKLE PATTERN GENERATION DEVICE, PSEUDO SPECKLE PATTERN GENERATION METHOD, OBSERVATION DEVICE, AND OBSERVATION METHOD

CROSS-REFERENCE TO RELATED APPLICATIONS

This application is a continuation of U.S. patent application Ser. No. 16/603,906, filed Oct. 9, 2019, which is 371 of International Patent Application No. PCT/JP2018/012131, filed Mar. 26, 2018, which claims the benefit of priority to Japanese Patent Application No. 2017-077475, filed Apr. 10, 2017, the contents of each of which is incorporated herein by reference.

TECHNICAL FIELD

The present disclosure relates to a pseudo speckle pattern generation apparatus, an observation apparatus including the pseudo speckle pattern generation apparatus, a pseudo speckle pattern generation method, and an observation method including the pseudo speckle pattern generation method.

BACKGROUND ART

When coherent light such as laser light is scattered by a diffuser (scattering medium) such as a diffuser plate, a speckle pattern is generated by interference of the scattered light. A spatial distribution of light intensity in a speckle pattern has a property close to that of a random number pattern, and for this reason, a speckle pattern is used in an interference measurement technique, a super-resolution microscope, an optical measurement technique, and the like, and further, is recently used in an optical manipulation technique such as trapping of an atom and a particle colloid.

A speckle pattern is characterized by a spatial structure and a light intensity statistical distribution. The spatial structure is expressed by a spatial shape of an autocorrelation function of a speckle pattern, and corresponds to a point spread function of an optical system. The light intensity statistical distribution is expressed by a histogram of light intensity in a speckle pattern, and follows an exponential distribution. In addition, a spatial structure (autocorrelation function) of a two-dimensional pseudo random number pattern in which ideal random numbers are arranged two-dimensionally is a delta function.

According to the technique described in Non Patent Document 1, in a configuration including a diffuser and a lens, a speckle pattern is generated on a plane different from a back focal plane of the lens. According to the technique described in Non Patent Document 2, in a configuration including a diffuser and a lens, various speckle patterns are generated by changing the position of the diffuser or replacing the diffuser.

According to the technique described in Non Patent Document 3, a spatial light modulator having a two-dimensional modulation distribution settable by an externally applied signal is used in place of a diffuser, and a speckle pattern is generated in a configuration including the spatial light modulator and a lens. The modulation distribution according to a two-dimensional pseudo random number pattern is set in the spatial light modulator.

CITATION LIST

Non Patent Literature

Non Patent Document 1: Vladlen G. Shvedov et al., "Selective trapping of multiple particles by volume speckle field", OPTICS EXPRESS, Vol. 18, No. 3, pp. 3137-3142 (2010)

Non Patent Document 2: E. Mudry et al., "Structured illumination microscopy using unknown speckle patterns", NATURE PHOTONICS, Vol. 6, pp. 312-315 (2012)

Non Patent Document 3: Yaron Bromberg and Hui Cao, "Generating Non-Rayleigh Speckles with Tailored Intensity Statistics", PHYSICAL REVIEW LETTERS 112, pp. 213904-1-213904-5 (2014)

SUMMARY OF INVENTION

Technical Problem

In the technique described in Non Patent Document 1, only one diffuser is used, which provides no freedom in setting the spatial structure and the light intensity statistical distribution of the speckle pattern to be generated.

In the technique described in Non Patent Document 2, the speckle pattern can be changed by replacing the diffuser. However, in this technique, it is necessary to prepare many diffusers for generation of various speckle patterns, which provides a low degree of freedom in setting the spatial structure and the light intensity statistical distribution of the speckle pattern to be generated. Further, when setting a speckle pattern by changing the diffuser position, it is extremely difficult to reproduce the same pattern.

In the technique described in Non Patent Document 3, the speckle pattern can be changed by changing the modulation distribution presented on the spatial light modulator according to the two-dimensional pseudo random number pattern. However, in this technique, only the contrast of the speckle pattern is adjusted, which provides a low degree of freedom in setting the spatial structure and the light intensity statistical distribution of the speckle pattern to be generated.

An object of embodiments is to provide a pseudo speckle pattern generation apparatus and a pseudo speckle pattern generation method that provide a high degree of freedom in setting a spatial structure or a light intensity statistical distribution of a speckle pattern to be generated and provide high reproducibility of the generated pattern. Further, an object of the embodiments is to provide an observation apparatus including the pseudo speckle pattern generation apparatus, and an observation method including the pseudo speckle pattern generation method.

Here, a pattern generated in the embodiments may have a spatial structure or a light intensity statistical distribution different from that of a normal speckle pattern generated using a diffuser, and thus will be referred to as a "pseudo speckle pattern".

Solution to Problem

An embodiment of the present invention is a pseudo speckle pattern generation apparatus. In one aspect, the pseudo speckle pattern generation apparatus includes (1) a light source for outputting light; (2) a spatial light modulator having a settable intensity modulation distribution, and for spatially modulating the light output from the light source according to the modulation distribution and outputting modulated light as a pseudo speckle pattern; and (3) a control unit for setting the modulation distribution of the spatial light modulator based on a pseudo random number pattern and a correlation function.

An embodiment of the present invention is a pseudo speckle pattern generation apparatus. In another aspect, the pseudo speckle pattern generation apparatus includes (1) a light source for outputting light; (2) a spatial light modulator having a settable phase modulation distribution, and for spatially modulating the light output from the light source according to the modulation distribution and outputting modulated light; (3) a reproducing optical system for receiving the light output from the spatial light modulator and reproducing a pseudo speckle pattern on a light pattern generation plane; and (4) a control unit for setting a computer generated hologram obtained based on a pseudo random number pattern and a correlation function as the modulation distribution of the spatial light modulator.

An embodiment of the present invention is an observation apparatus. The observation apparatus includes (1) the pseudo speckle pattern generation apparatus of the above configuration; (2) an observation light source for outputting observation light to be applied to the light pattern generation plane on which the pseudo speckle pattern is generated by the pseudo speckle pattern generation apparatus; and (3) a camera for receiving and imaging light generated by the application of the observation light to the light pattern generation plane.

An embodiment of the present invention is a pseudo speckle pattern generation method. In one aspect, the pseudo speckle pattern generation method includes using a spatial light modulator having a settable intensity modulation distribution; setting the modulation distribution of the spatial light modulator based on a pseudo random number pattern and a correlation function; spatially modulating light output from a light source according to the modulation distribution and outputting modulated light as a pseudo speckle pattern.

An embodiment of the present invention is a pseudo speckle pattern generation method. In another aspect, the pseudo speckle pattern generation method includes using a spatial light modulator having a settable phase modulation distribution; setting a computer generated hologram obtained based on a pseudo random number pattern and a correlation function as the modulation distribution of the spatial light modulator; spatially modulating light output from a light source according to the modulation distribution and outputting modulated light; and by a reproducing optical system for receiving the light output from the spatial light modulator, reproducing a pseudo speckle pattern on a light pattern generation plane.

An embodiment of the present invention is an observation method. The observation method includes applying observation light output from an observation light source to the light pattern generation plane on which the pseudo speckle pattern is generated by the pseudo speckle pattern generation method of the above configuration; and by a camera, receiving and imaging light generated by the application of the observation light to the light pattern generation plane.

Advantageous Effects of Invention

According to the embodiments, it is possible to provide a high degree of freedom in setting the spatial structure or the light intensity statistical distribution of the generated pseudo speckle pattern, and provide a reproducibility of the generated pattern.

BRIEF DESCRIPTION OF DRAWINGS

FIG. 3 is a table summarizing examples of a correlation function c and a filter function F.

FIG. 4 includes (a) a diagram illustrating an example of a two-dimensional pseudo random number pattern a(x, y) in which a statistical distribution follows a normal distribution, and (b) a diagram illustrating a pseudo speckle pattern b(x, y) obtained by using the two-dimensional pseudo random number pattern a(x, y) of (a) in FIG. 4 and a correlation function $c(r)=\exp(-r)$.

FIG. 5 includes (a) a diagram illustrating a pseudo speckle pattern b(x, y) obtained by using the two-dimensional pseudo random number pattern a(x, y) of (a) in FIG. 4 and a correlation function $c(r)=\exp(-r/9)$, and (b) a diagram illustrating a light intensity statistical distribution (luminance histogram) of the pseudo speckle pattern b(x, y) of (a) in FIG. 5.

FIG. 7 includes (a) a diagram illustrating a pseudo speckle pattern b(x, y) by using the two-dimensional pseudo random number pattern a(x, y) of (a) in FIG. 4 and a correlation function $c(r)=\exp(-r/3)$, and (b) a diagram illustrating an autocorrelation image of the pseudo speckle pattern b(x, y) of (a) in FIG. 7.

FIG. 14 includes (a) a diagram illustrating a pseudo speckle pattern b(x, y) reproduced on a light pattern generation plane P when the computer generated hologram of FIG. 13 is set as a phase modulation distribution in the spatial light modulator 15 of the pseudo speckle pattern generation apparatus 1D of the fourth embodiment, and (b) a diagram illustrating a light intensity statistical distribution (luminance histogram) of the pseudo speckle pattern b(x, y) of (a) in FIG. 14.

DESCRIPTION OF EMBODIMENTS

Hereinafter, embodiments of a pseudo speckle pattern generation apparatus, a pseudo speckle pattern generation method, an observation apparatus, and an observation method will be described in detail with reference to the accompanying drawings. In the description of the drawings, the same elements will be denoted with the same reference symbols, and overlapping description will be omitted. The present invention is not limited to these examples.

Figure 1:
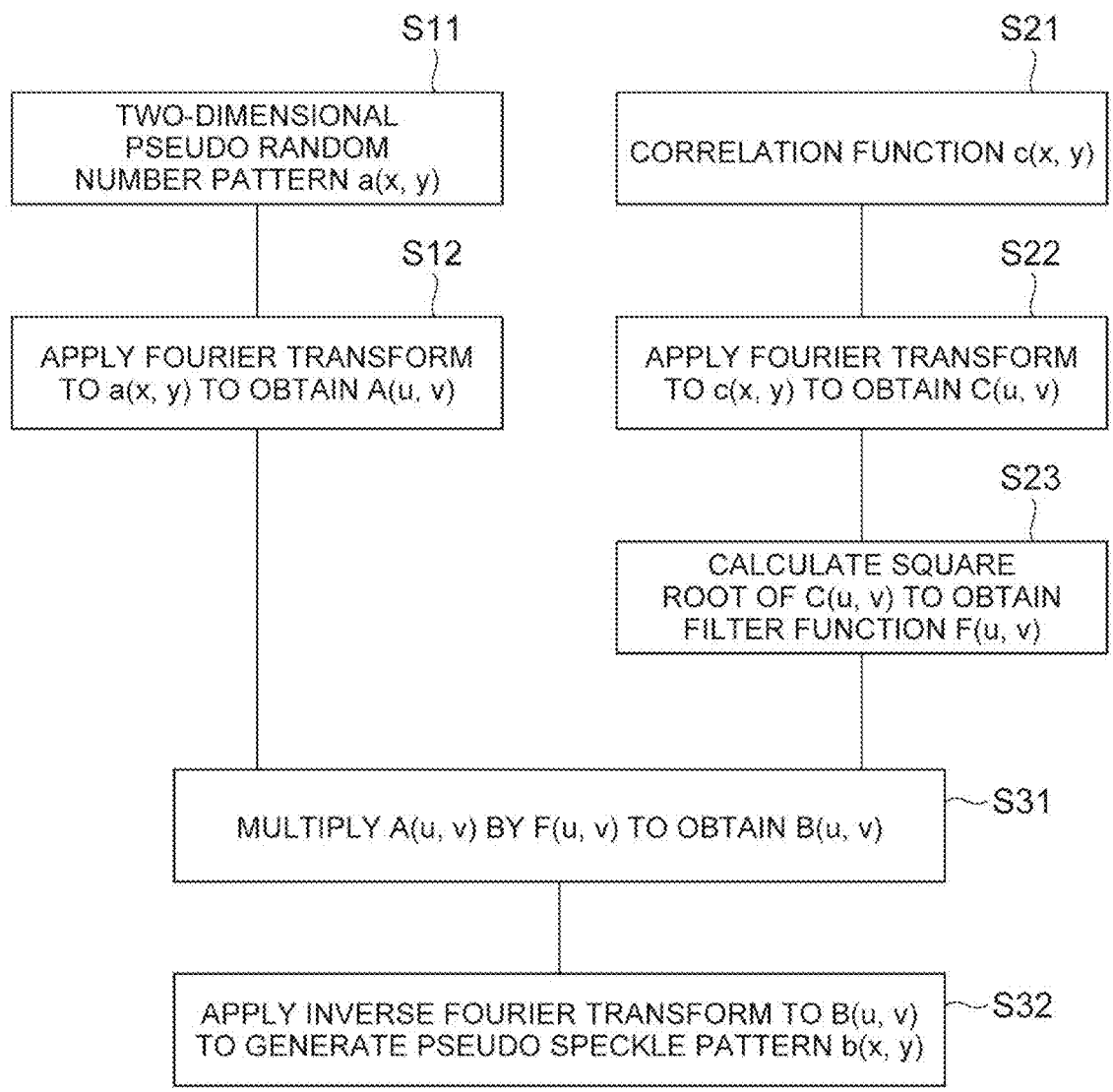
FIG. 1 is a flowchart of a calculation procedure in the case of obtaining a pseudo speckle pattern by calculation.

First, a pseudo speckle pattern generated in the present embodiment will be described. FIG. 1 is a flowchart of a calculation procedure for obtaining a pseudo speckle pattern by calculation. In addition, in functions described below, a function represented by a small letter is a function in real space, and a function represented by a capital letter is a function in Fourier space. Further, (x, y) show a position expressed by an orthogonal coordinate system in real space, and (u, v) show a position expressed by an orthogonal coordinate system in Fourier space.

In step S11, a two-dimensional pseudo random number pattern a(x, y) is generated. Specifically, a one-dimensional pseudo random number sequence which follows a predetermined seed number and a statistical distribution is generated by an arbitrary generation method, and these pseudo random numbers are arranged two-dimensionally to generate the two-dimensional pseudo random number pattern a(x, y). When the seed number and the statistical distribution at the time of the generation of the one-dimensional pseudo random number sequence and the arrangement rule at the time of the two-dimensional arrangement are the same, the generation of the two-dimensional pseudo random number pattern a(x, y) has reproducibility. In step S12, a(x, y) is applied with Fourier transform to obtain A(u, v) (formula (1)).

[Formula 1]

$$A(u, v) = \text{FFT}[a(x, y)] \quad (1)$$

In step S21, a correlation function c(x, y) is prepared. In step S22, c(x, y) is applied with Fourier transform to obtain C(u, v) (formula (2)). In step S23, a square root of C(u, v) is calculated to obtain a filter function F(u, v) (formula (3)).

[Formula 2]

$$C(u, v) = \text{FFT}[c(x, y)] \quad (2)$$

[Formula 3]

$$F(u, v) = \sqrt{C(u, v)} \quad (3)$$

In step S31, A(u, v) is multiplied by F(u, v) to obtain B(u, v) (formula (4)). Then, in step S32, B(u, v) is applied with inverse Fourier transform to obtain a pseudo speckle pattern b(x, y) (formula (5)). Here, Fourier transform and inverse Fourier transform can be performed by similar calculation processing in the case of numerical calculation, and further, can be implemented by similar optical system in the case of an optical system, and thus, there is no need to distinguish between these.

[Formula 4]

$$B(u, v) = A(u, v) \cdot F(u, v) \quad (4)$$

[Formula 5]

$$b(x, y) = \text{IFFT}[B(u, v)] \quad (5)$$

The pseudo speckle pattern b(x, y) generated in the above manner has a light intensity statistical distribution according to the statistical distribution of the two-dimensional pseudo random number pattern a(x, y) and a spatial structure (autocorrelation function) according to the correlation function c(x, y) corresponding to the filter function F(u, v). In addition, the filter function F(u, v) is obtained by calculating the square root of C(u, v) in step S23 in order to allow the autocorrelation function of the pseudo speckle pattern b(x, y) and the correlation function c(x, y) to match with each other.

Figure 2:
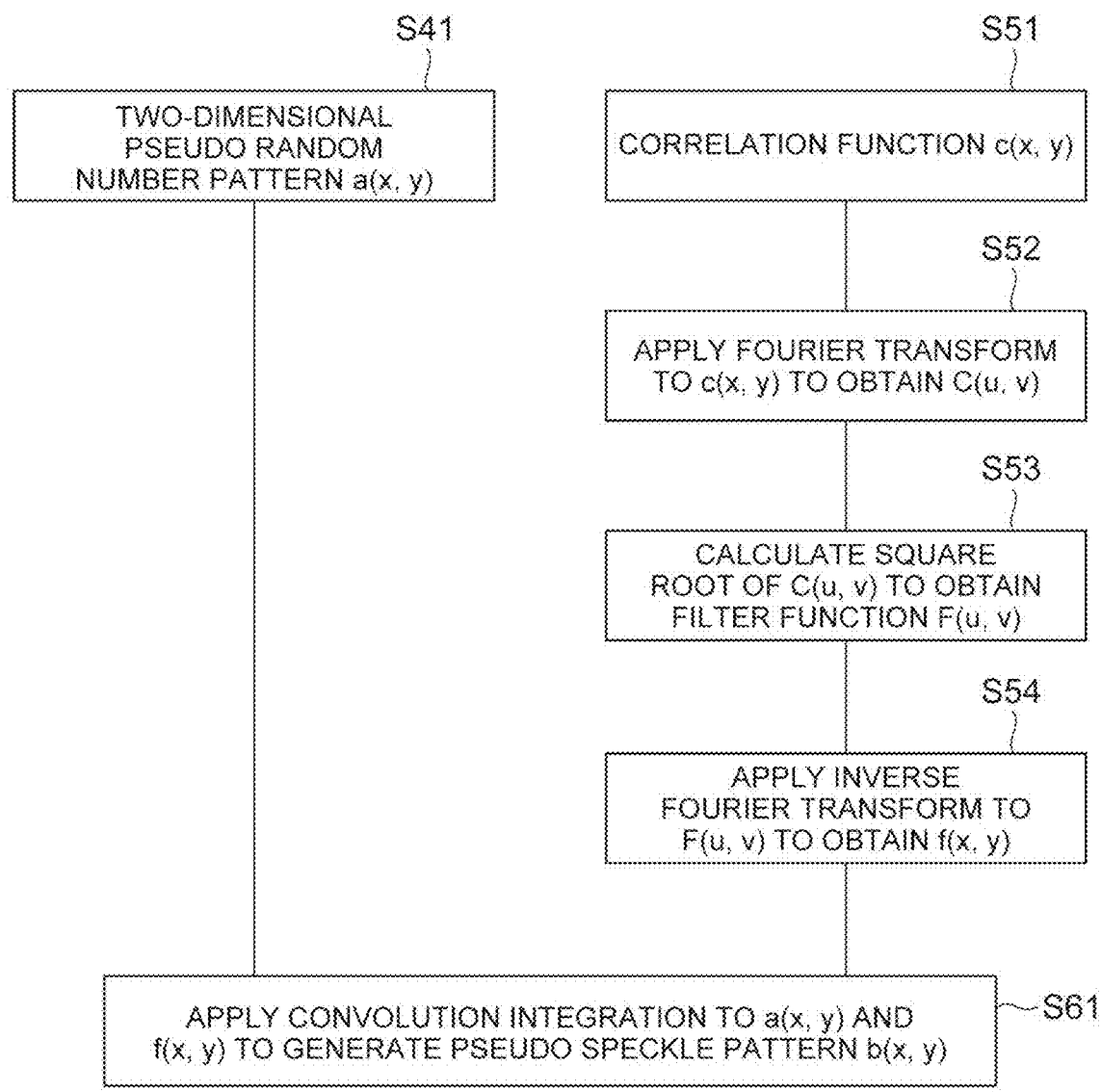
FIG. 2 is a flowchart of another calculation procedure in the case of obtaining a pseudo speckle pattern by calculation.

The pseudo speckle pattern can also be obtained according to other calculation procedures. FIG. 2 is a flowchart of another calculation procedure for obtaining a pseudo speckle pattern by calculation.

In step S41, a two-dimensional pseudo random number pattern a(x, y) is generated. In step S51, a correlation function c(x, y) is prepared. In step S52, c(x, y) is applied with Fourier transform to obtain C(u, v) (formula (2)). In step S53, a square root of C(u, v) is calculated to obtain the filter function F(u, v) (formula (3)). Steps S41, S51, S52, and S53 are processing similar to that of steps S11, S21, S22, and S23.

In step S54, F(u, v) is applied with inverse Fourier transform to obtain f(x, y) (formula (6)). In step S61, a(x, y) and f(x, y) are applied with convolution integration to obtain a pseudo speckle pattern b(x, y) (formula (7)).

[Formula 6]

$$f(x, y) = \text{IFFT}[F(u, v)] \quad (6)$$

[Formula 7]

$$b(x, y) = a(x, y) * f(x, y) \quad (7)$$

The pseudo speckle pattern b(x, y) generated in the above manner also has a light intensity statistical distribution according to a statistical distribution of the two-dimensional pseudo random number pattern a(x, y) and a spatial structure (autocorrelation function) according to the correlation function c(x, y).

In the present embodiment, the pseudo speckle pattern b(x, y) may be obtained according to any of the calculation procedures illustrated in FIG. 1 and FIG. 2.

That is, Fourier transform (A(u, v)) of the two-dimensional pseudo random number pattern a(x, y) having a statistical distribution according to a light intensity statistical distribution of the pseudo speckle pattern b(x, y) to be generated is set as a first pattern, a pattern of a square root (F(u, v)) of Fourier transform of the correlation function c(x, y) according to an autocorrelation function of the pseudo speckle pattern b(x, y) to be generated is set as a second pattern, and a pattern of inverse Fourier transform of a product of the first pattern and the second pattern can be set as the pseudo speckle pattern b(x, y).

Alternatively, the two-dimensional pseudo random number pattern a(x, y) having a statistical distribution according to a light intensity statistical distribution of the pseudo speckle pattern b(x, y) to be generated is set as a first pattern, a pattern of inverse Fourier transform (f(x, y)) of a square root of Fourier transform of the correlation function c(x, y) according to an autocorrelation function of the pseudo speckle pattern b(x, y) to be generated is set as a second pattern, and a pattern of convolution integral of the first pattern and the second pattern can be set as the pseudo speckle pattern b(x, y).

FIG. 3 is a table showing examples of the correlation function c and the filter function F. The correlation function c shown in the table is a function c(r) in which only a distance r from the origin (0, 0) in real space is a variable. The corresponding filter function F is also a function F(k) in which only a distance k from the origin (0, 0) in Fourier space is a variable. In each formula, r and k are non-negative real numbers, and η and ξ are positive real numbers.

As the correlation function c(x, y), a function with which C(u, v) of a result of Fourier transform becomes a function of a non-negative real number is selected, and a function with which a function value is gradually decreased as the distance r becomes larger is preferred. The correlation function c is preferably a function which has only the distance r as a variable. The correlation function c may be a function which has x and y as variables (for example, exp(−|x+y|/ξ)). The correlation function c may have a function value of 1 at the origin (0, 0), and the function value may be an arbitrary value. The correlation function c may be one which cannot be expressed in a mathematical formula.

(a) in FIG. 4 is a diagram illustrating an example of the two-dimensional pseudo random number pattern a(x, y) in which a statistical distribution follows a normal distribution. (b) in FIG. 4 is a diagram illustrating the pseudo speckle pattern b(x, y) obtained by using the two-dimensional pseudo random number pattern a(x, y) of (a) in FIG. 4 and the correlation function c(r)=exp(−r). (a) in FIG. 5 is a diagram illustrating the pseudo speckle pattern b(x, y) obtained by using the two-dimensional pseudo random number pattern a(x, y) of (a) in FIG. 4 and the correlation function c(r)=exp(−r/9). (b) in FIG. 5 is a diagram illustrating a light intensity statistical distribution (luminance histogram) of the pseudo speckle pattern b(x, y) of (a) in FIG. 5.

Figure 6:
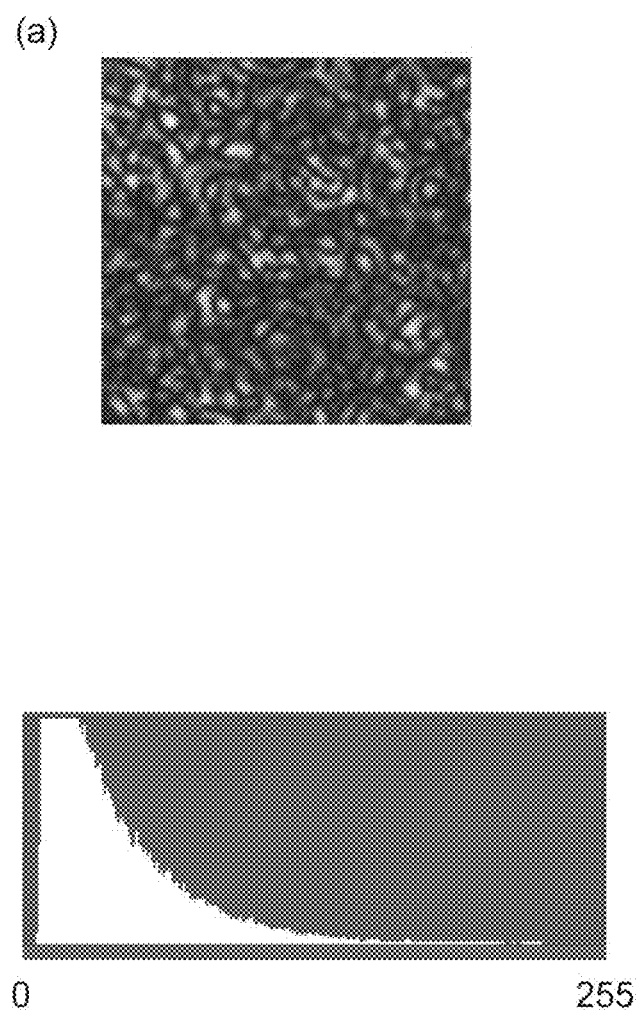
FIG. 6 includes (a) a diagram illustrating an example of a speckle pattern generated by using a diffuser, and (b) a diagram illustrating a light intensity statistical distribution (luminance histogram) of the speckle pattern of (a) in FIG. 6.

(a) in FIG. 6 is a diagram illustrating an example of a speckle pattern generated by using a diffuser. (b) in FIG. 6 is a diagram illustrating a light intensity statistical distribution (luminance histogram) of the speckle pattern of (a) in FIG. 6. The light intensity statistical distribution ((b) in FIG. 6) of the speckle pattern generated by using a diffuser can be approximated by an exponential function distribution, while the light intensity statistical distribution ((b) in FIG. 5) of the pseudo speckle pattern b(x, y) can be approximated by a normal distribution, and substantially matches with a statistical distribution of the two-dimensional pseudo random number pattern a(x, y). Here, the horizontal axis of the light intensity statistical distribution (luminance histograms) of (b) in FIG. 5 and (b) in FIG. 6 shows a light intensity in 256 tones.

Figure 8:
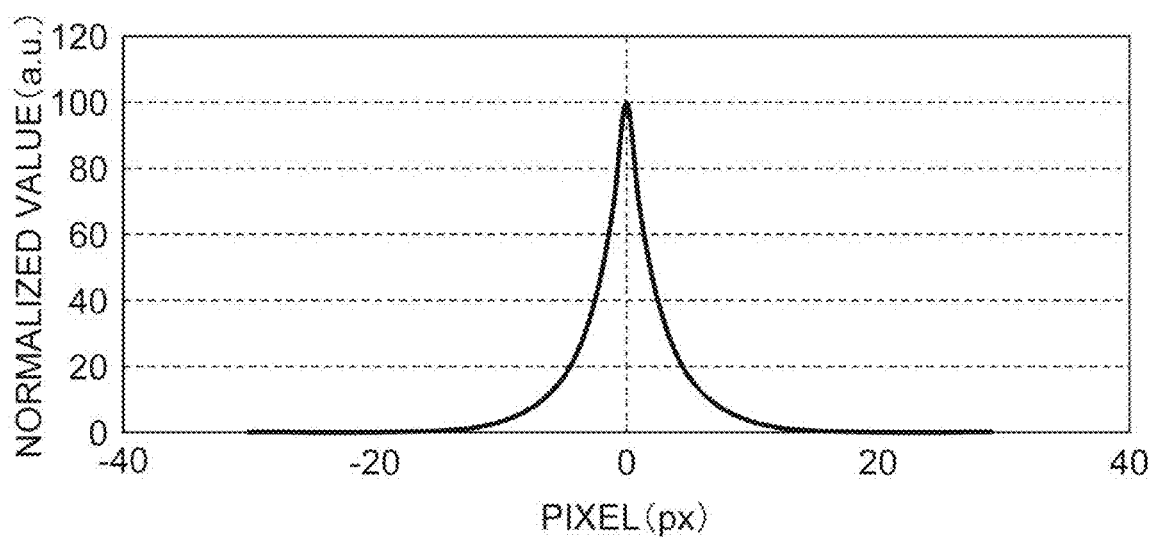
FIG. 8 is a diagram illustrating an intensity profile in the autocorrelation image of (b) in FIG. 7.

(a) in FIG. 7 is a diagram illustrating the pseudo speckle pattern b(x, y) obtained by using the two-dimensional pseudo random number pattern a(x, y) of (a) in FIG. 4 and the correlation function c(r)=exp(−r/3). (b) in FIG. 7 is a diagram illustrating an autocorrelation image of the pseudo speckle pattern b(x, y) of (a) in FIG. 7. FIG. 8 is a diagram illustrating an intensity profile in the autocorrelation image of (b) in FIG. 7. The intensity profiles in an x direction and a y direction substantially match with each other, and also substantially match with the correlation function c(r)=exp(−r/3). That is, the autocorrelation function of the pseudo speckle pattern b(x, y) substantially matches with the correlation function c.

In the pseudo speckle pattern generation apparatus and the pseudo speckle pattern generation method of the present embodiment, a spatial light modulator having a modulation distribution of intensity or phase based on the two-dimensional pseudo random number pattern a(x, y) and the filter function F(u, v) is used to optically generate the pseudo speckle pattern b(x, y).

Figure 9:
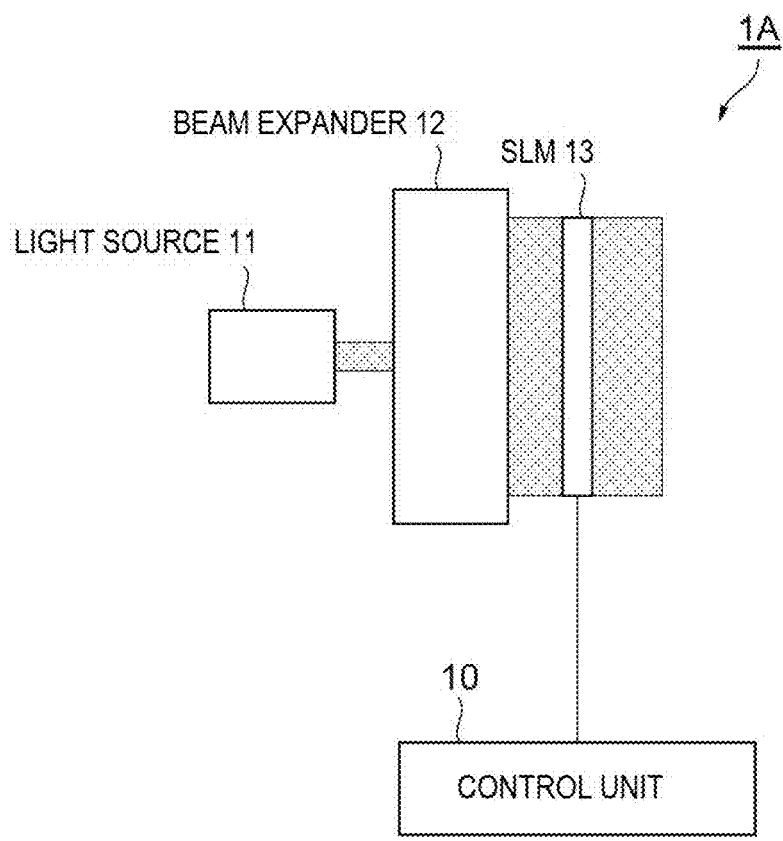
FIG. 9 is a diagram illustrating a configuration of a pseudo speckle pattern generation apparatus 1A of a first embodiment.

FIG. 9 is a diagram illustrating a configuration of a pseudo speckle pattern generation apparatus 1A of a first embodiment. The pseudo speckle pattern generation apparatus 1A includes a control unit 10, a light source 11, a beam expander 12, and a spatial light modulator 13, and outputs a pseudo speckle pattern b(x, y) to an output plane of the spatial light modulator 13.

The light source 11 outputs light. As the light source 11, for example, a laser light source, a lamp light source, a superluminescent diode (SLD) light source or the like is used. The beam expander 12 is optically coupled to the light source 11, and outputs the light output from the light source 11 with increase in the beam diameter. At this time, the light output from the beam expander 12 preferably has an intensity which is uniform in a beam cross section.

The spatial light modulator 13 is of the intensity modulation type, and has an intensity modulation distribution based on the pseudo speckle pattern b(x, y) generated in step S32 or S61. As the spatial light modulator 13, for example, a modulator with a liquid crystal modulation medium, a digital minor device (DMD), or a deformable minor (DM) is used. The spatial light modulator 13 is optically coupled to the beam expander 12, receives the light output from the light source 11 and increased in beam diameter by the beam expander 12, spatially modulates the received light according to the modulation distribution, and outputs the modulated light.

The pseudo speckle pattern b(x, y) generated in this manner on the output plane of the spatial light modulator 13 has a light intensity statistical distribution according to a statistical distribution of the two-dimensional pseudo random number pattern a(x, y), and has a spatial structure according to the correlation function c(x, y).

The control unit 10 is electrically coupled to the spatial light modulator 13, and sets the intensity modulation distribution based on the pseudo speckle pattern b(x, y) calculated from the two-dimensional pseudo random number pattern a(x, y) and the correlation function c(x, y) in the spatial light modulator 13.

The control unit 10 is configured, for example, with a computer, and includes a communication unit which is electrically coupled to the spatial light modulator 13 and performs communication, and further, an arithmetic unit, a storage unit, an input unit, and a display unit. The arithmetic unit includes a CPU, a DSP, or the like, and performs generation of the two-dimensional pseudo random number pattern a(x, y) and the correlation function c(x, y), Fourier transform, square root calculation, multiplication, convolution integration, autocorrelation function calculation, intensity statistical distribution calculation, and the like.

The storage unit includes, for example, a hard disk, a memory, or the like, and stores generation conditions of the two-dimensional pseudo random number pattern a(x, y) and the correlation function c(x, y), calculation results of respective patterns, and the like. The input unit includes, for example, a keyboard, a pointing device, or the like, and receives input of the above generation condition and the like. The display unit includes, for example, a liquid crystal display, and displays patterns of a(x, y), A(u, v), c(x, y), C(u, v), F(u, v), f(x, y), B(u, v), b(x, y), and the like.

In the present embodiment, the intensity modulation distribution of the spatial light modulator 13 is set based on the pseudo speckle pattern b(x, y) calculated from the two-dimensional pseudo random number pattern a(x, y) and the correlation function c(x, y), and this provides a high degree of freedom in setting the spatial structure or the light intensity statistical distribution of the generated pseudo speckle pattern b(x, y).

By using the two-dimensional pseudo random number pattern a(x, y) having the statistical distribution according to the light intensity statistical distribution of the pseudo speckle pattern b(x, y) to be generated, and the correlation function c(x, y) according to the autocorrelation function of the pseudo speckle pattern b(x, y) to be generated, to set the intensity modulation distribution of the spatial light modulator 13 based on the pseudo speckle pattern b(x, y) calculated from these, it is possible to generate the pseudo speckle pattern b(x, y) having the desired light intensity statistical distribution and the desired spatial structure.

The pseudo speckle pattern generation apparatus or the pseudo speckle pattern generation method according to the present embodiment can provide a high degree of freedom in setting the spatial structure or the light intensity statistical distribution of the generated pseudo speckle pattern b(x, y). In addition, the control unit 10 can set the spatial structure or the light intensity statistical distribution of the pseudo speckle pattern b(x, y) with high reproducibility and can change the setting quickly.

The pseudo speckle pattern generation apparatus or the pseudo speckle pattern generation method according to the present embodiment can generate the pseudo speckle pattern b(x, y) suitable for the measurement object or the optical manipulation object, and can be favorably used in measurement techniques and optical manipulation techniques effective in various verification methods. Further, the pseudo speckle pattern generation apparatus or the pseudo speckle pattern generation method according to the present embodiment can also generate a bright pseudo speckle pattern having high luminance when the pseudo speckle pattern is used as structured illumination, and this decreases the number of illuminations and implements high-sensitivity and short-time illumination.

It can be confirmed as described below that the pseudo speckle pattern b(x, y) having the desired spatial structure and light intensity statistical distribution can be generated by the present embodiment. That is, a camera is used to capture an image of the pseudo speckle pattern b(x, y) generated on the output plane of the spatial light modulator 13. Then, the control unit 10 determines an autocorrelation function of the pseudo speckle pattern b(x, y) obtained by imaging, and compares the function with the correlation function c(x, y). Further, the control unit 10 determines a light intensity statistical distribution of the pseudo speckle pattern b(x, y) obtained by imaging, and compares the distribution with the statistical distribution of the two-dimensional pseudo random number pattern a(x, y).

Figure 10:
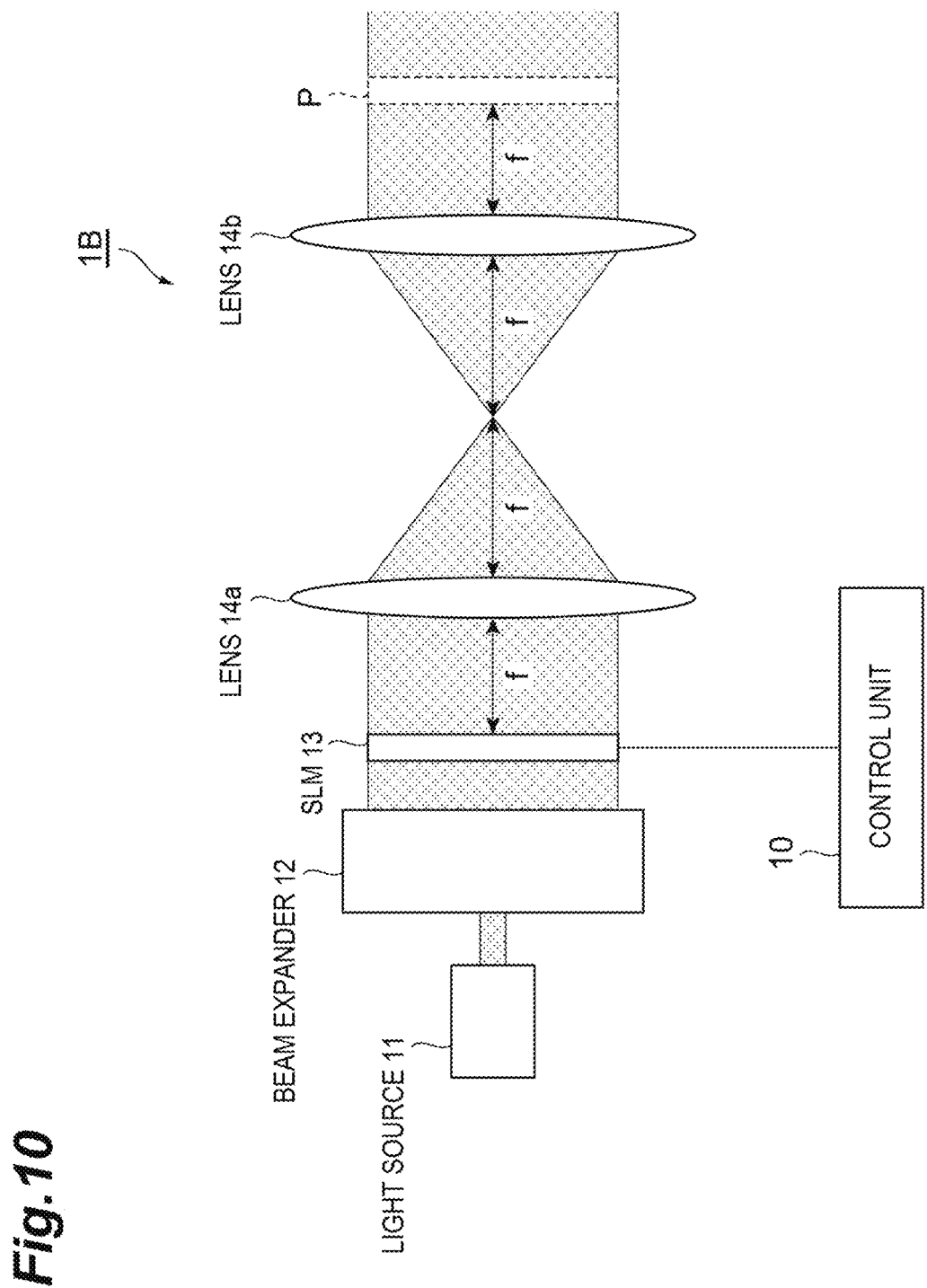
FIG. 10 is a diagram illustrating a configuration of a pseudo speckle pattern generation apparatus 1B of a second embodiment.

FIG. 10 is a diagram illustrating a configuration of a pseudo speckle pattern generation apparatus 1B of a second embodiment. The pseudo speckle pattern generation apparatus 1B includes a control unit 10, a light source 11, a beam expander 12, a spatial light modulator 13, and lenses 14a and 14b, and generates a pseudo speckle pattern b(x, y) on a light pattern generation plane (image plane) P. The pseudo speckle pattern generation apparatus 1B of the second embodiment illustrated in FIG. 10 is different from the configuration of the pseudo speckle pattern generation apparatus 1A of the first embodiment illustrated in FIG. 9 in including the lenses 14a and 14b.

The optical system from the spatial light modulator 13 to the light pattern generation plane P constitutes a 4f imaging optical system. The lenses 14a and 14b receive the light output from the spatial light modulator 13 and form an image of the pseudo speckle pattern b(x, y) on the light pattern generation plane P. Using the imaging optical system including the lenses 14a and 14b as described above makes it possible to generate the pseudo speckle pattern b(x, y) on the light pattern generation plane P located at a position different from the output plane of the spatial light modulator 13.

Figure 11:
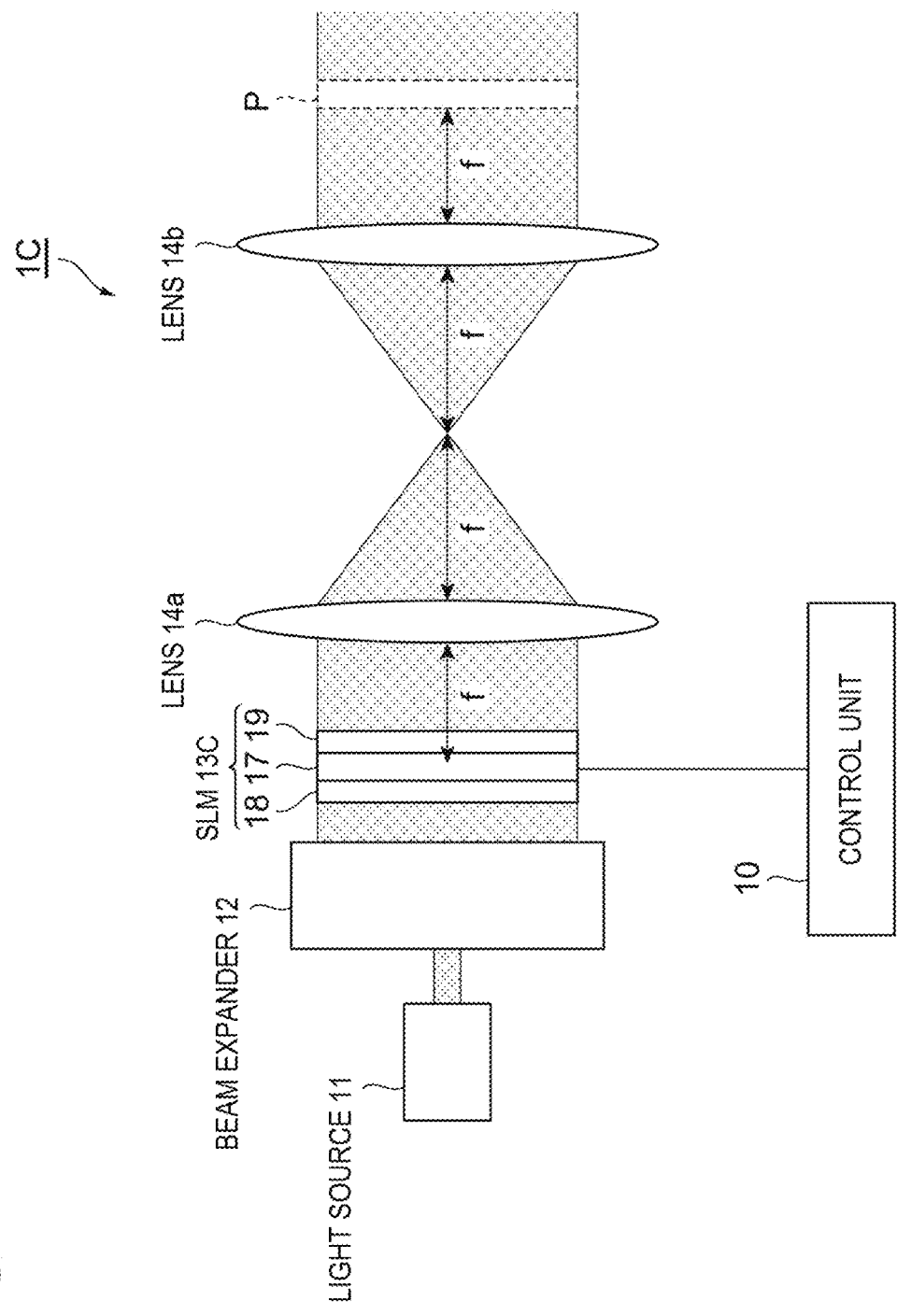
FIG. 11 is a diagram illustrating a configuration of a pseudo speckle pattern generation apparatus 1C of a third embodiment.

FIG. 11 is a diagram illustrating a configuration of a pseudo speckle pattern generation apparatus 1C of a third embodiment. The pseudo speckle pattern generation apparatus 1C includes a control unit 10, a light source 11, a beam expander 12, a phase modulation type spatial light modulator 17, polarizing plates 18 and 19, and lenses 14a and 14b, and generates a pseudo speckle pattern b(x, y) on a light pattern generation plane P. The pseudo speckle pattern generation apparatus 1C of the third embodiment illustrated in FIG. 11 is different from the configuration of the pseudo speckle pattern generation apparatus 1B of the second embodiment illustrated in FIG. 10 in including the phase modulation type spatial light modulator 17 and the polarizing plates 18 and 19 in place of the intensity modulation type spatial light modulator 13. As the phase modulation type spatial light modulator 17, for example, a modulator with a liquid crystal modulation medium is used.

The polarizing plate 18 and the polarizing plate 19 are provided with the phase modulation type spatial light modulator 17 interposed therebetween. In general, the spatial light modulator 17 with the liquid crystal modulation medium has liquid crystal molecules in a specific orientation direction. The polarizing plates 18 and 19 are arranged so as to have a polarization direction at an angle of 45° relative to the orientation direction of the liquid crystal molecules. The polarization directions of the polarizing plates 18 and 19 may be parallel to each other or perpendicular to each other. When being arranged in this manner, the phase modulation type spatial light modulator 17 and the polarizing plates 18 and 19 substantially function as an intensity modulation type spatial light modulator 13C.

The control unit 10 is electrically coupled to the spatial light modulator 13C (the spatial light modulator 17 constituting the modulator), and sets the intensity modulation distribution of the spatial light modulator 13C (the phase modulation distribution of the spatial light modulator 17).

In addition, in each of the pseudo speckle pattern generation apparatuses 1B and 1C, the light pattern generation plane P on which the pseudo speckle pattern b(x, y) is generated may be the back focal plane of the lens 14b, or may be a plane different from the back focal plane. For example, setting a pattern in which a Fresnel lens pattern is added to the intensity modulation distribution for the spatial light modulator 13 or 13C makes it possible to generate the pseudo speckle pattern b(x, y) on the light pattern generation plane P located at a position different from the back focal plane of the lens 14b.

Figure 12:
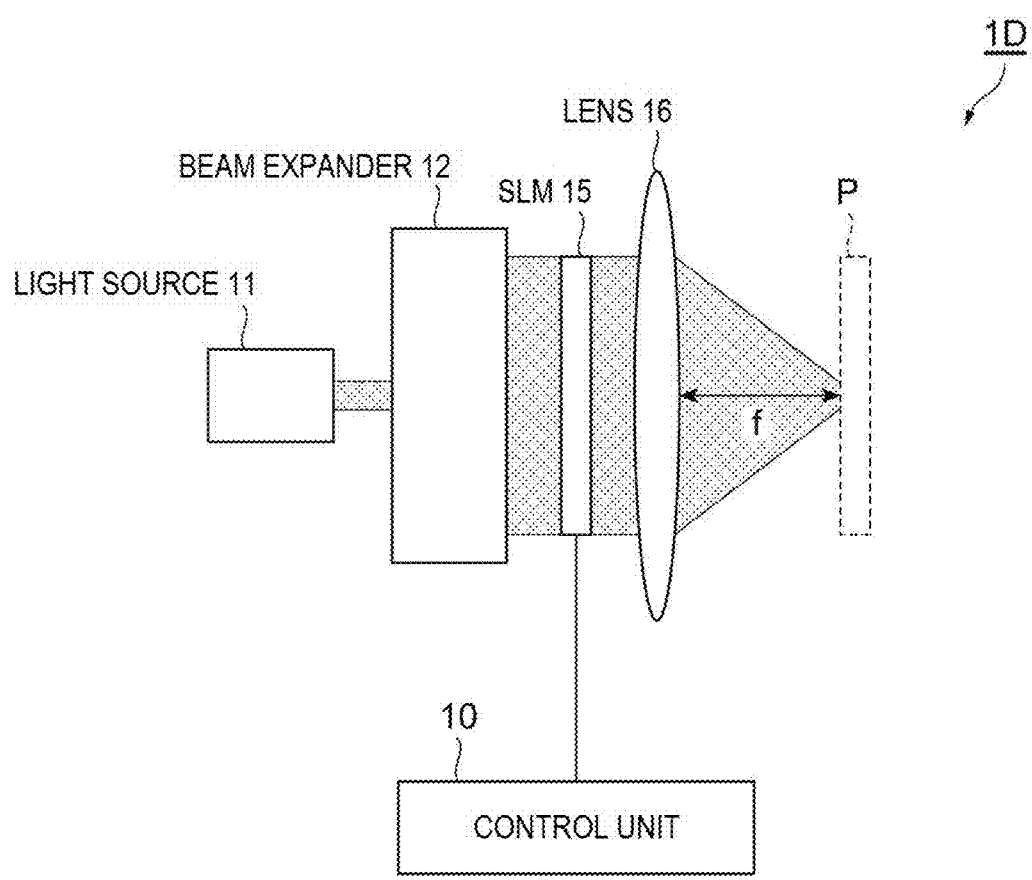
FIG. 12 is a diagram illustrating a configuration of a pseudo speckle pattern generation apparatus 1D of a fourth embodiment.

FIG. 12 is a diagram illustrating a configuration of a pseudo speckle pattern generation apparatus 1D of a fourth embodiment. The pseudo speckle pattern generation apparatus 1D includes a control unit 10, a light source 11, a beam expander 12, a spatial light modulator 15, and a lens 16, and generates a pseudo speckle pattern b(x, y) on a light pattern generation plane P.

The spatial light modulator 15 is of the phase modulation type, and has a phase modulation distribution based on the pseudo speckle pattern b(x, y) generated in step S32 or S61. As the phase modulation type spatial light modulator 15, for example, a modulator with a liquid crystal modulation medium is used. The spatial light modulator 15 is optically coupled to the beam expander 12, receives the light output from the light source 11 and increased in beam diameter by the beam expander 12, spatially modulates the received light according to the modulation distribution, and outputs the modulated light. The lens 16 is a reproducing optical system which receives the light output from the spatial light modulator 15 and reproduces the pseudo speckle pattern b(x, y) on the light pattern generation plane P.

The control unit 10 sets a computer generated hologram obtained based on the two-dimensional pseudo random number pattern a(x, y) and the correlation function c(x, y) as the modulation distribution of the spatial light modulator 15. The phase modulation distribution set in the spatial light modulator 15 is a computer generated hologram in which the light output from the spatial light modulator 15 can be reproduced as the pseudo speckle pattern b(x, y) on the light pattern generation plane P by the lens 16 (reproducing optical system). The control unit 10 generates the computer generated hologram having the pseudo speckle pattern b(x, y) as a reproduced image, by using the iterative Fourier transform method, and sets the computer generated hologram to the spatial light modulator 15.

In addition, FIG. 12 illustrates the spatial light modulator 15 of a transmission type, but a spatial light modulator of a reflection type may be used instead.

Figure 13:
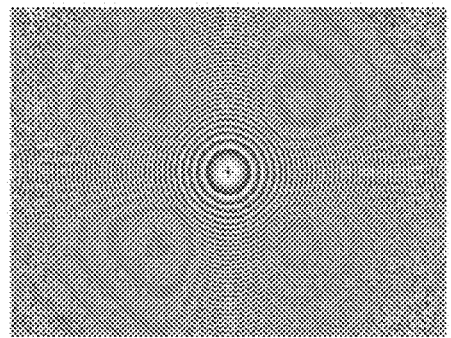
FIG. 13 is a diagram illustrating an example of a computer generated hologram set in a spatial light modulator 15 of the pseudo speckle pattern generation apparatus 1D of the fourth embodiment.

FIG. 13 is a diagram illustrating an example of the computer generated hologram set in the spatial light modulator 15 of the pseudo speckle pattern generation apparatus 1D of the fourth embodiment. In this diagram, degree of phase modulation is shown by a gray scale. In this case, the pseudo speckle pattern b(x, y) is calculated by using the two-dimensional pseudo random number pattern a(x, y) of which the statistical distribution follows a normal distribution and the correlation function $c(x, y)=\exp(-r/9)$, and the computer generated hologram is obtained based on the pseudo speckle pattern b(x, y).

(a) in FIG. 14 is a diagram illustrating the pseudo speckle pattern b(x, y) reproduced on the light pattern generation plane P when the computer generated hologram of FIG. 13 is set as a phase modulation distribution in the spatial light modulator 15 of the pseudo speckle pattern generation apparatus 1D of the fourth embodiment. (b) in FIG. 14 is a diagram illustrating a light intensity statistical distribution (luminance histogram) of the pseudo speckle pattern b(x, y) of (a) in FIG. 14. The light intensity statistical distribution of the reproduced pseudo speckle pattern b(x, y) can be confirmed to be a normal distribution, similar to the statistical distribution of the two-dimensional pseudo random number pattern a(x, y).

Next, an embodiment of an observation apparatus including the pseudo speckle pattern generation apparatus of the present embodiment and an embodiment of an observation method including the pseudo speckle pattern generation method of the present embodiment will be described. According to the observation apparatus or the observation method of the present embodiment, observation light is applied to the light pattern generation plane P on which a pseudo speckle pattern is generated by the pseudo speckle pattern generation apparatus or the pseudo speckle pattern generation method of the present embodiment described above, light generated according to the application of the light to the light pattern generation plane P (transmitted light, reflected light, scattered light, fluorescence, or the like) is received, and a minute object or the like on the light pattern generation plane P irradiated with the pseudo speckle pattern is imaged.

Figure 15:
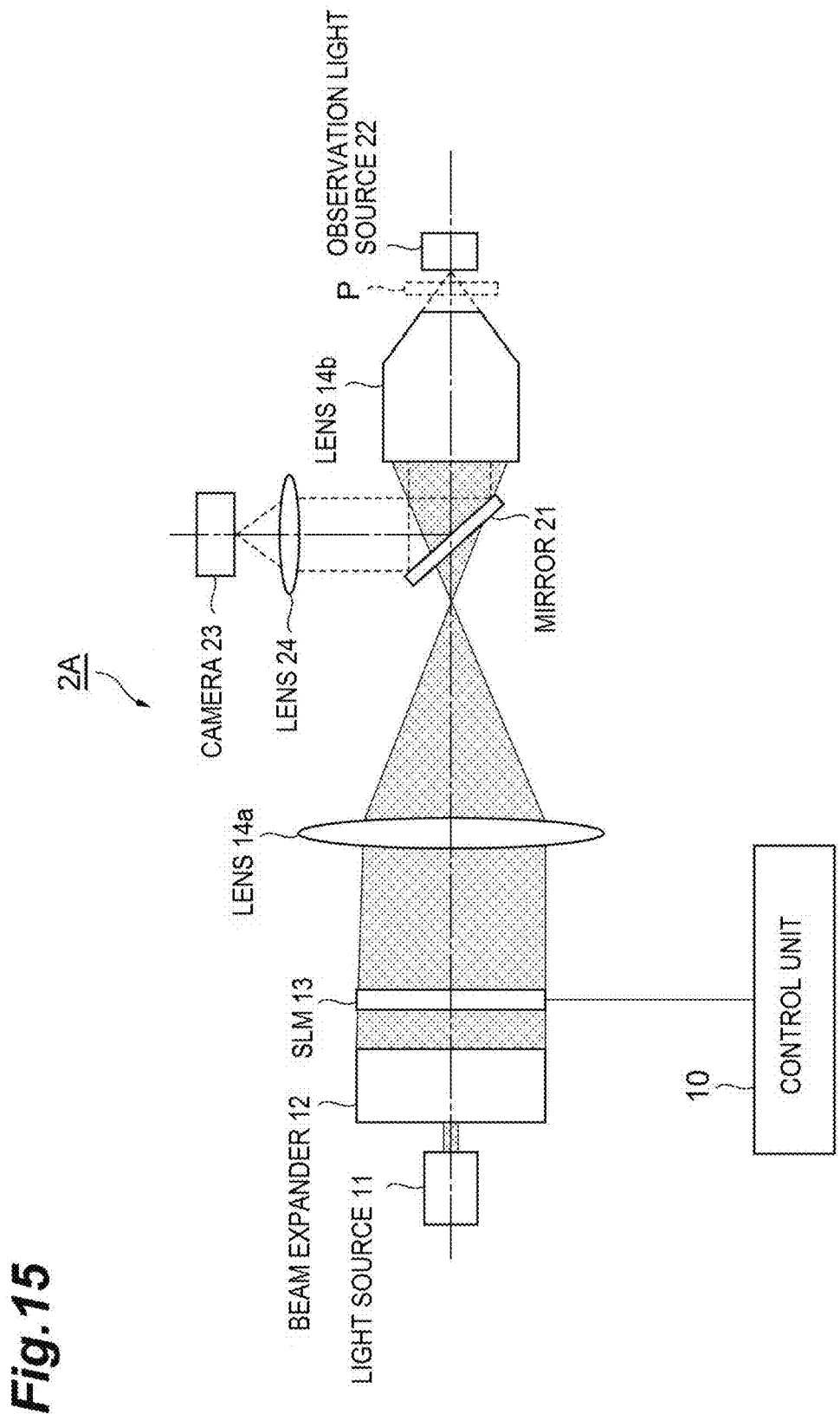
FIG. 15 is a diagram illustrating a configuration of an observation apparatus 2A of a fifth embodiment.

FIG. 15 is a diagram illustrating a configuration of an observation apparatus 2A of a fifth embodiment. The observation apparatus 2A includes a control unit 10, a light source 11, a beam expander 12, a spatial light modulator 13, and lenses 14a and 14b, and generates a pseudo speckle pattern on a light pattern generation plane P. These are similar to the configuration of the pseudo speckle pattern generation apparatus 1B of the second embodiment. An objective lens is used as the lens 14b.

In addition to the configuration of the pseudo speckle pattern generation apparatus 1B, the observation apparatus 2A further includes a dichroic mirror 21, an observation light source 22, a camera 23, and a lens 24. The dichroic mirror 21 is provided on an optical path between the lens 14a and the lens 14b, transmits the light output from the light source 11, and reflects the light output from the observation light source 22.

The observation light source 22 outputs observation light having a wavelength different from a wavelength of the light output from the light source 11. The observation light source 22 is provided on the side of the light pattern generation plane P opposite to the side where the lens 14b is provided, and applies the observation light to the light pattern generation plane P. The light generated in response to the application of the observation light by the observation light source 22 passes through the lens 14b, is reflected by the dichroic mirror 21, passes through the lens 24, and reaches the imaging plane of the camera 23. The lens 14b and the lens 24 form an image of the light generated on the light pattern generation plane P on the imaging plane of the camera 23. The camera 23 captures an image of a minute object or the like on the light pattern generation plane P irradiated with the pseudo speckle pattern. The camera 23 is, for example, a CCD camera or a CMOS camera.

Figure 16:
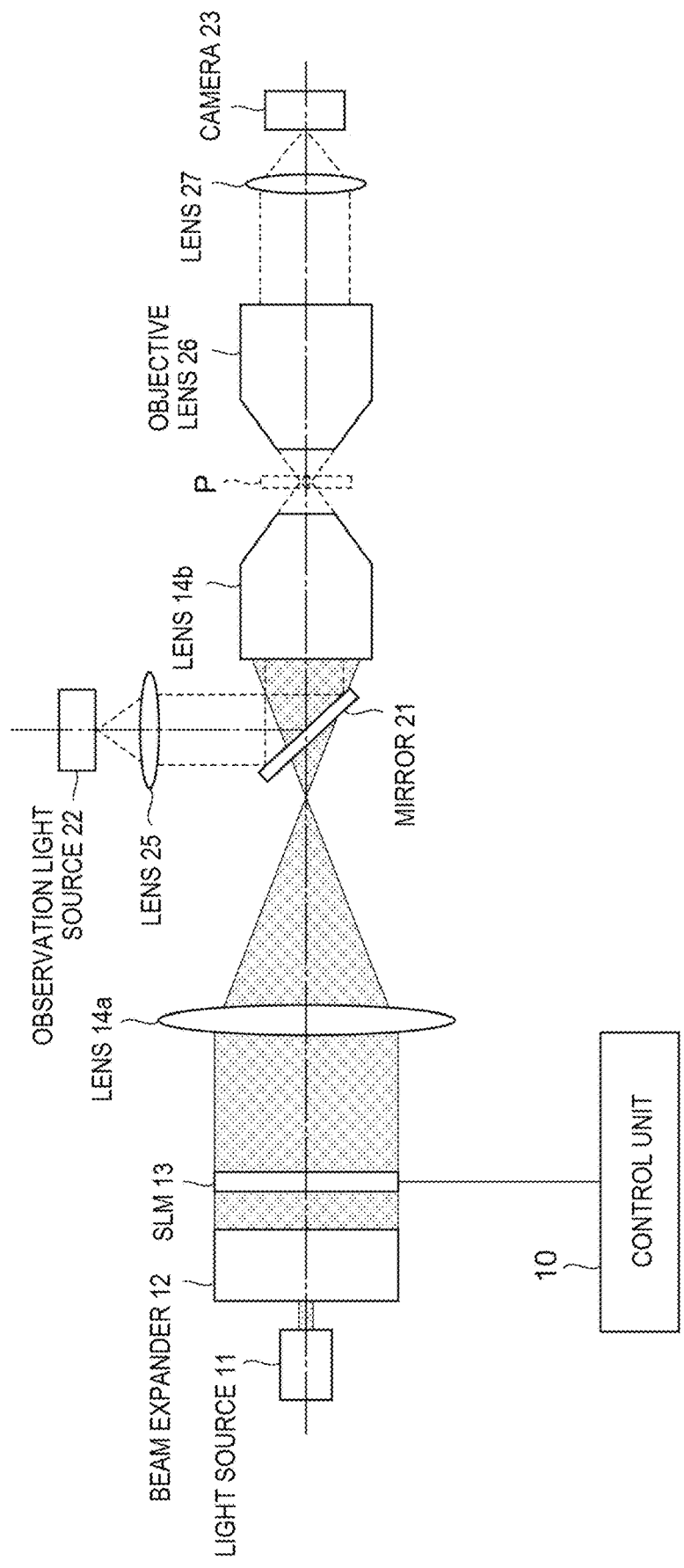
FIG. 16 is a diagram illustrating a configuration of an observation apparatus 2B of a sixth embodiment.

FIG. 16 is a diagram illustrating a configuration of an observation apparatus 2B of a sixth embodiment. The observation apparatus 2B includes a control unit 10, a light source 11, a beam expander 12, a spatial light modulator 13, and lenses 14a and 14b, and generates a pseudo speckle pattern on a light pattern generation plane P. These are similar to the configuration of the pseudo speckle pattern generation apparatus 1B of the second embodiment. An objective lens is used as the lens 14b.

In addition to the configuration of the pseudo speckle pattern generation apparatus 1B, the observation apparatus 2B further includes a dichroic mirror 21, an observation light source 22, a camera 23, a lens 25, an objective lens 26, and a lens 27. The dichroic minor 21 is provided on an optical path between the lens 14a and the lens 14b, transmits the light output from the light source 11, and reflects the light output from the observation light source 22.

The observation light source 22 outputs observation light having a wavelength different from a wavelength of the light output from the light source 11. The light output from the observation light source 22 passes through the lens 25, is reflected by the dichroic mirror 21, passes through the lens 14b, and is applied to the light pattern generation plane P. The camera 23, the objective lens 26, and the lens 27 are provided on the side of the light pattern generation plane P opposite to the side where the lens 14b is provided. The light generated in response to the application of the observation light by the observation light source 22 passes through the objective lens 26 and the lens 27 and reaches the imaging plane of the camera 23. The objective lens 26 and the lens 27 form an image of the light generated on the light pattern generation plane P on the imaging plane of the camera 23. The camera 23 captures an image of a minute object or the like on the light pattern generation plane P irradiated with the pseudo speckle pattern.

Figure 17:
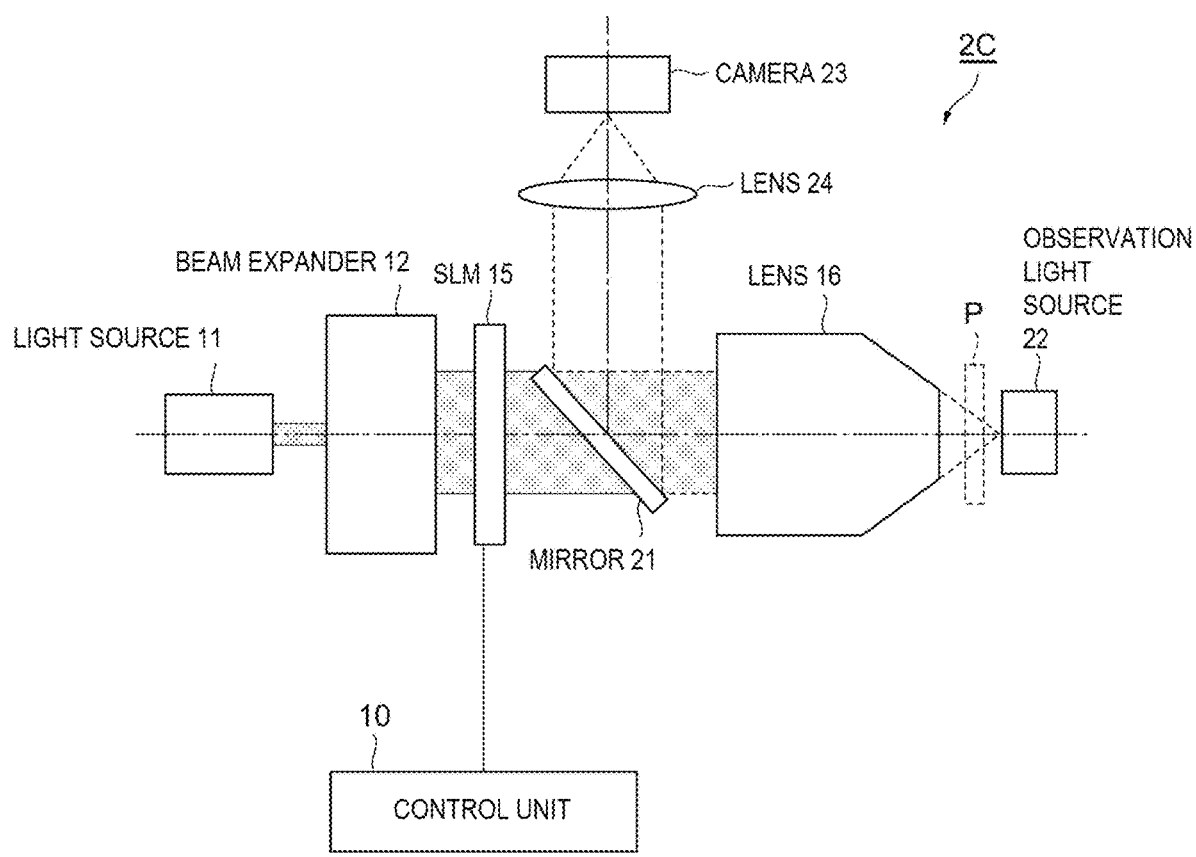
FIG. 17 is a diagram illustrating a configuration of an observation apparatus 2C of a seventh embodiment.

FIG. 17 is a diagram illustrating a configuration of an observation apparatus 2C of a seventh embodiment. The observation apparatus 2C includes a control unit 10, a light source 11, a beam expander 12, a spatial light modulator 15, and a lens 16, and generates a pseudo speckle pattern on a light pattern generation plane P. These are similar to the configuration of the pseudo speckle pattern generation apparatus 1D of the fourth embodiment. An objective lens is used as the lens 16.

In addition to the configuration of the pseudo speckle pattern generation apparatus 1D, the observation apparatus 2C further includes a dichroic mirror 21, an observation light source 22, a camera 23, and a lens 24. The dichroic mirror 21 is provided on an optical path between the spatial light modulator 15 and the lens 16, transmits the light output from the light source 11, and reflects the light output from the observation light source 22.

The observation light source 22 outputs observation light having a wavelength different from a wavelength of the light output from the light source 11. The observation light source 22 is provided on the side of the light pattern generation plane P opposite to the side where the lens 16 is provided, and applies the observation light to the light pattern generation plane P. The light generated in response to the application of the observation light by the observation light source 22 passes through the lens 16, is reflected by the dichroic mirror 21, passes through the lens 24, and reaches the imaging plane of the camera 23. The lens 16 and the lens 24 form an image of the light generated on the light pattern generation plane P on the imaging plane of the camera 23. The camera 23 captures an image of a minute object or the like on the light pattern generation plane P irradiated with the pseudo speckle pattern.

Figure 18:
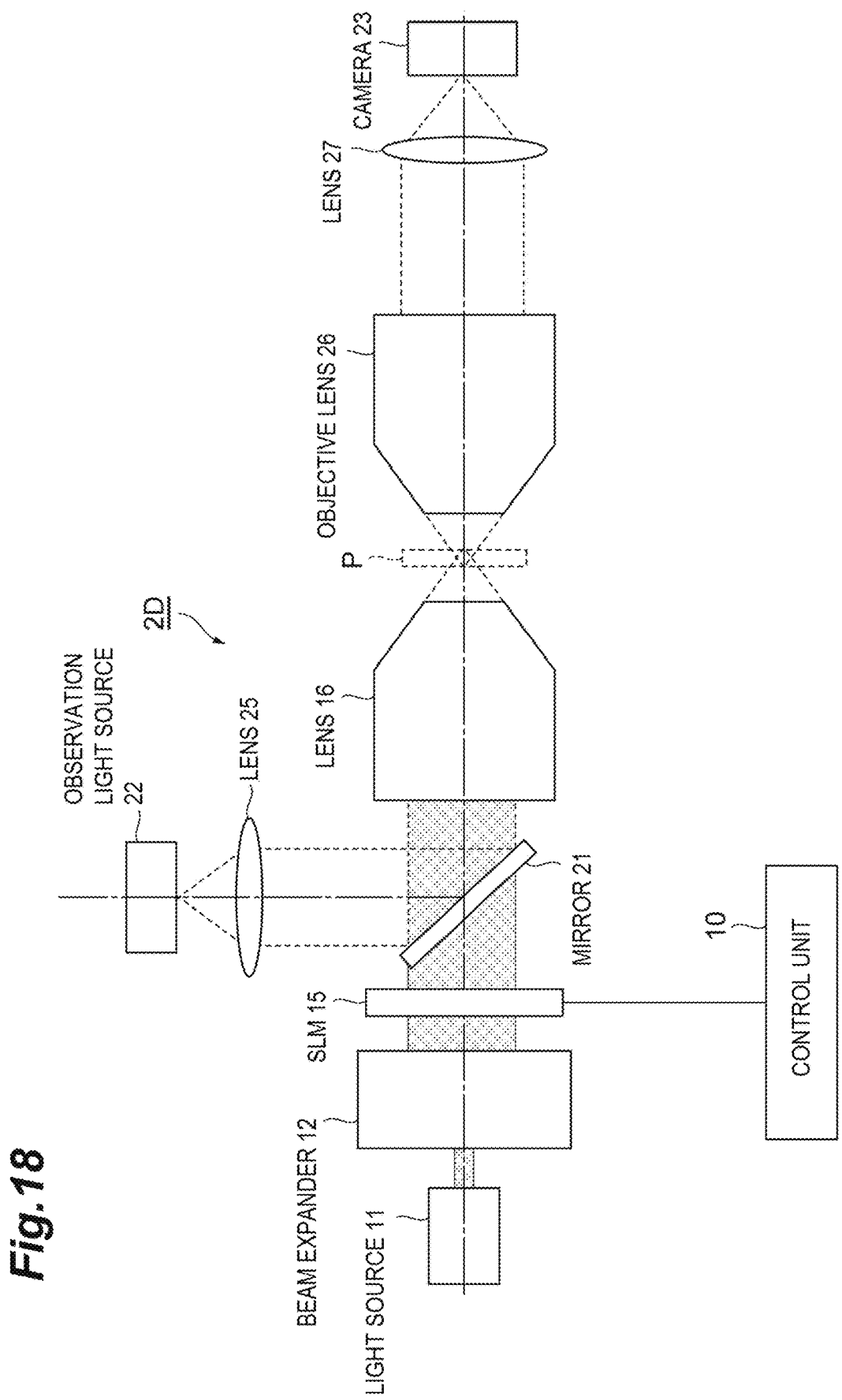
FIG. 18 is a diagram illustrating a configuration of an observation apparatus 2D of an eighth embodiment.

FIG. 18 is a diagram illustrating a configuration of an observation apparatus 2D of an eighth embodiment. The observation apparatus 2D includes a control unit 10, a light source 11, a beam expander 12, a spatial light modulator 15, and a lens 16, and generates a pseudo speckle pattern on a light pattern generation plane P. These are similar to the configuration of the pseudo speckle pattern generation apparatus 1D of the fourth embodiment. An objective lens is used as the lens 16.

In addition to the configuration of the pseudo speckle pattern generation apparatus 1D, the observation apparatus 2D further includes a dichroic mirror 21, an observation light source 22, a camera 23, a lens 25, an objective lens 26, and a lens 27. The dichroic mirror 21 is provided on an optical path between the spatial light modulator 15 and the lens 16, transmits the light output from the light source 11, and reflects the light output from the observation light source 22.

The observation light source 22 outputs observation light having a wavelength different from a wavelength of the light output from the light source 11. The light output from the observation light source 22 passes through the lens 25, is reflected by the dichroic mirror 21, passes through the lens 16, and is applied to the light pattern generation plane P. The camera 23, the objective lens 26, and the lens 27 are provided on the side of the light pattern generation plane P opposite to the side where the lens 16 is provided. The light generated in response to the application of the observation light by the observation light source 22 passes through the objective lens 26 and the lens 27 and reaches the imaging plane of the camera 23. The objective lens 26 and the lens 27 form an image of the light generated on the light pattern generation plane P on the imaging plane of the camera 23. The camera 23 captures an image of a minute object or the like on the light pattern generation plane P irradiated with the pseudo speckle pattern.

These observation apparatuses 2A to 2D are suitably used as microscopic imaging apparatuses when the pseudo speckle pattern generation apparatus is applied to optical manipulation techniques including optical trapping technique and structured illumination technique or optical imaging technique. According to the observation apparatus or observation method of the present embodiment, a pseudo speckle pattern generated by the pseudo speckle pattern generation apparatus or the pseudo speckle pattern generation method is used for optical manipulation such as trapping or sorting of a minute object, and this enables various types of optical manipulation and observation of the state of the optical manipulation.

In addition, in the above embodiment, the pseudo random number pattern and the pseudo speckle pattern are two-dimensional, however, the pseudo random number pattern and the pseudo speckle pattern may be one-dimensional or three-dimensional.

The pseudo speckle pattern generation apparatus, the pseudo speckle pattern generation method, the observation apparatus, and the observation method are not limited to the embodiments and configuration examples described above, and can be modified in various manners.

The pseudo speckle pattern generation apparatus of the above embodiment is, in one aspect, configured to include (1) a light source for outputting light; (2) a spatial light modulator having a settable intensity modulation distribution, and for spatially modulating the light output from the light source according to the modulation distribution and outputting modulated light as a pseudo speckle pattern; and (3) a control unit for setting the modulation distribution of the spatial light modulator based on a pseudo random number pattern and a correlation function.

Further, in this case, the pseudo speckle pattern generation apparatus may be configured to further include an imaging optical system for receiving the light output from the spatial light modulator and forming an image of the pseudo speckle pattern on a light pattern generation plane.

The pseudo speckle pattern generation apparatus of the above embodiment is, in another aspect, configured to include (1) a light source for outputting light; (2) a spatial light modulator having a settable phase modulation distribution, and for spatially modulating the light output from the light source according to the modulation distribution and outputting modulated light; (3) a reproducing optical system for receiving the light output from the spatial light modulator and reproducing a pseudo speckle pattern on a light pattern generation plane; and (4) a control unit for setting a computer generated hologram obtained based on a pseudo random number pattern and a correlation function as the modulation distribution of the spatial light modulator.

In the above pseudo speckle pattern generation apparatus, the control unit may be configured to set, as a first pattern, Fourier transform of the pseudo random number pattern having a statistical distribution according to a light intensity statistical distribution of the pseudo speckle pattern to be generated, set, as a second pattern, a pattern of a square root of Fourier transform of the correlation function according to an autocorrelation function of the pseudo speckle pattern to be generated, and set the modulation distribution based on a pattern of inverse Fourier transform of a product of the first pattern and the second pattern in the spatial light modulator.

Further, in the above pseudo speckle pattern generation apparatus, the control unit may be configured to set, as a first pattern, the pseudo random number pattern having a statistical distribution according to a light intensity statistical distribution of the pseudo speckle pattern to be generated, set, as a second pattern, a pattern of inverse Fourier transform of a square root of Fourier transform of the correlation function according to an autocorrelation function of the pseudo speckle pattern to be generated, and set the modulation distribution based on a pattern of convolution integral of the first pattern and the second pattern in the spatial light modulator.

The observation apparatus of the above embodiment is configured to include (1) the pseudo speckle pattern generation apparatus of the above configuration; (2) an observation light source for outputting observation light to be applied to the light pattern generation plane on which the pseudo speckle pattern is generated by the pseudo speckle pattern generation apparatus; and (3) a camera for receiving and imaging light generated by the application of the observation light to the light pattern generation plane.

The pseudo speckle pattern generation method of the above embodiment is, in one aspect, configured to include using a spatial light modulator having a settable intensity modulation distribution; setting the modulation distribution of the spatial light modulator based on a pseudo random number pattern and a correlation function; spatially modulating light output from a light source according to the modulation distribution and outputting modulated light as a pseudo speckle pattern.

Further, in this case, the pseudo speckle pattern generation method may be configured to include using an imaging optical system for receiving the light output from the spatial light modulator and forming an image of the pseudo speckle pattern on a light pattern generation plane.

The pseudo speckle pattern generation method of the above embodiment is, in another aspect, configured to include using a spatial light modulator having a settable phase modulation distribution; setting a computer generated hologram obtained based on a pseudo random number pattern and a correlation function as the modulation distribution of the spatial light modulator; spatially modulating light output from a light source according to the modulation distribution and outputting modulated light; and by a reproducing optical system for receiving the light output from the spatial light modulator, reproducing a pseudo speckle pattern on a light pattern generation plane.

The above pseudo speckle pattern generation method may be configured to include setting, as a first pattern, Fourier transform of the pseudo random number pattern having a statistical distribution according to a light intensity statistical distribution of the pseudo speckle pattern to be generated, setting, as a second pattern, a pattern of a square root of Fourier transform of the correlation function according to an autocorrelation function of the pseudo speckle pattern to be generated, and setting the modulation distribution based on a pattern of inverse Fourier transform of a product of the first pattern and the second pattern in the spatial light modulator.

Further, the above pseudo speckle pattern generation method may be configured to include setting, as a first pattern, the pseudo random number pattern having a statistical distribution according to a light intensity statistical distribution of the pseudo speckle pattern to be generated, setting, as a second pattern, a pattern of inverse Fourier transform of a square root of Fourier transform of the correlation function according to an autocorrelation function of the pseudo speckle pattern to be generated, and setting the modulation distribution based on a pattern of convolution integral of the first pattern and the second pattern in the spatial light modulator.

The observation method of the above embodiment is configured to include applying observation light output from an observation light source to the light pattern generation plane on which the pseudo speckle pattern is generated by the pseudo speckle pattern generation method of the above configuration; and by a camera, receiving and imaging light generated by the application of the observation light to the light pattern generation plane.

INDUSTRIAL APPLICABILITY

The embodiments can be used as a pseudo speckle pattern generation apparatus, a pseudo speckle pattern generation method, an observation apparatus, and an observation method.

REFERENCE SIGNS LIST 1A-1D—pseudo speckle pattern generation apparatus, 2A-2D—observation apparatus, 10—control unit, 11—light source, 12—beam expander, 13—spatial light modulator, 14a, 14b—lens (imaging optical system), 15—spatial light modulator, 16—lens (reproducing optical system), 17—spatial light modulator, 18, 19—polarizing plate, 21—dichroic mirror, 22—observation light source, 23—camera, 24—lens, 25—lens, 26—objective lens, 27—lens, P—light pattern generation plane.

The invention claimed is:

1. A pseudo speckle pattern generation apparatus comprising:
   a light source configured to output light;
   a spatial light modulator having a settable intensity modulation distribution, and configured to spatially modulate the light output from the light source according to the settable intensity modulation distribution and output modulated light as a pseudo speckle pattern; and
   a control circuit configured to set the settable intensity modulation distribution of the spatial light modulator based on a pseudo random number pattern and a correlation function, wherein the control circuit is configured to:
     set, as a first pattern, the pseudo random number pattern having a statistical distribution according to a light intensity statistical distribution of the pseudo speckle pattern to be generated,
     set, as a second pattern, a pattern of inverse Fourier transform of a square root of Fourier transform of the correlation function according to an autocorrelation function of the pseudo speckle pattern to be generated, and
     set the settable intensity modulation distribution based on a pattern of convolution integral of the first pattern and the second pattern in the spatial light modulator.

2. The pseudo speckle pattern generation apparatus according to claim 1, further comprising an imaging optical system configured to receive the modulated light output from the spatial light modulator and form an image of the pseudo speckle pattern on a light pattern generation plane.

3. A pseudo speckle pattern generation apparatus comprising:
   a light source configured to output light;
   a spatial light modulator having a settable phase modulation distribution, and configured to spatially modulate the light output from the light source according to the settable phase modulation distribution and output modulated light;
   a reproducing optical system configured to receive the modulated light output from the spatial light modulator and reproduce a pseudo speckle pattern on a light pattern generation plane; and a control circuit configured to set a computer generated hologram obtained based on a pseudo random number pattern and a correlation function as the settable phase modulation distribution of the spatial light modulator, wherein the control circuit is configured to:

set, as a first pattern, the pseudo random number pattern having a statistical distribution according to a light intensity statistical distribution of the pseudo speckle pattern to be generated, set, as a second pattern, a pattern of inverse Fourier transform of a square root of Fourier transform of the correlation function according to an autocorrelation function of the pseudo speckle pattern to be generated, and set the settable phase modulation distribution based on a pattern of convolution integral of the first pattern and the second pattern in the spatial light modulator.

* * * * *